US012611796B2

(12) United States Patent
Malcolmson

(10) Patent No.: US 12,611,796 B2
(45) Date of Patent: Apr. 28, 2026

(54) DELIVERY DEVICE FOR CONCRETE ADMIXTURES AND PROCESS FOR RETARDING THE SETTING OF SURFACE PORTION OF CONCRETE

(71) Applicant: David Malcolmson, Hythe (GB)

(72) Inventor: David Malcolmson, Hythe (GB)

( * ) Notice: Subject to any disclaimer, the term of this patent is extended or adjusted under 35 U.S.C. 154(b) by 587 days.

(21) Appl. No.: 17/801,985

(22) PCT Filed: Mar. 10, 2021

(86) PCT No.: PCT/IB2021/051994
§ 371 (c)(1),
(2) Date: Aug. 24, 2022

(87) PCT Pub. No.: WO2021/181302
PCT Pub. Date: Sep. 16, 2021

(65) Prior Publication Data
US 2023/0107914 A1 Apr. 6, 2023

Related U.S. Application Data

(60) Provisional application No. 62/987,892, filed on Mar. 11, 2020.

(30) Foreign Application Priority Data

Jan. 27, 2021 (GB) ..................................... 2101065

(51) Int. Cl.
*B28B 7/32* (2006.01)
*B28B 7/36* (2006.01)
(Continued)

(52) U.S. Cl.
CPC .......... *B28B 7/362* (2013.01); *C04B 40/0039* (2013.01); *C04B 40/0633* (2013.01); *C04B 40/0641* (2013.01); *C04B 2103/0077* (2013.01)

(58) Field of Classification Search
CPC ....... B28B 7/362; B28B 7/36; C04B 40/0039; C04B 40/0633; C04B 40/0641; C04B 2103/0077; E04G 9/10
See application file for complete search history.

(56) References Cited

U.S. PATENT DOCUMENTS

| | | | |
|---|---|---|---|
| 5,120,367 A | 6/1992 | Smith et al. | |
| 6,376,580 B1 * | 4/2002 | Ikuta ..................... | C04B 24/267 524/5 |
| 2016/0010346 A1 * | 1/2016 | Calmes ............... | B28B 19/0061 249/15 |

FOREIGN PATENT DOCUMENTS

| | | | | |
|---|---|---|---|---|
| DE | 202008007232 U1 * | 11/2009 | ............... | E06B 1/62 |
| EP | 2 760 653 B1 | 8/2017 | | |

(Continued)

OTHER PUBLICATIONS

JP_H1045992_Machine_Translation (Year: 1998).*

(Continued)

*Primary Examiner* — Amber R Orlando
*Assistant Examiner* — Anastasia A. Kuvayskaya
(74) *Attorney, Agent, or Firm* — Wood, Phillips, Katz, Clark & Mortimer

(57) ABSTRACT

A delivery device for concrete admixtures, in the form of a film of water-soluble material, having a concrete admixture incorporated within the film. The film can be attached to a formwork for concrete and has a protective layer, which is removable to allow the water in the concrete to dissolve the film and release the admixture into the concrete. The film contains the required quantity of admixture and is weather-resistant and substantially time-insensitive.

14 Claims, 1 Drawing Sheet

(51) Int. Cl.
    *C04B 40/00*    (2006.01)
    *C04B 40/06*    (2006.01)
    *C04B 103/00*    (2006.01)

(56)                    References Cited

FOREIGN PATENT DOCUMENTS

| EP | 3512677 | A1 |   | 7/2019 |   |            |
|----|---------|----|---|--------|---|------------|
| JP | H09 89736 | A |   | 4/1997 |   |            |
| JP | H1045992 | A | * | 2/1998 | .............. | C08L 33/08 |
| JP | H11 127721 | A |   | 5/1999 |   |            |
| JP | 2000 063185 | A |   | 2/2000 |   |            |
| JP | 3607010 | B2 | * | 1/2005 | .............. | C08L 33/08 |
| JP | 3650774 | B1 | * | 5/2005 | ............. | B28B 7/362 |

OTHER PUBLICATIONS

JP 3607010 B2_Machine Translation (Year: 2005).*
JP 3650774 B1_Machine Translation (Year: 2005).*
DE 202008007232_Machine Translation (Year: 2009).*
International Search Report issued Jun. 22, 2021 in International
Application No. PCT/IB2021/051994.
International Preliminary Report on Patentability issued Jun. 20,
2022 in International Application No. PCT/IB2021/051994.

* cited by examiner

DELIVERY DEVICE FOR CONCRETE ADMIXTURES AND PROCESS FOR RETARDING THE SETTING OF SURFACE PORTION OF CONCRETE

BACKGROUND OF THE INVENTION

Field of the Invention

This invention relates to a delivery device and in particular to a device for delivering admixtures to concrete in the form of a water soluble film containing an admixture.

Background Art

Reinforced concrete is a building material that is frequently used in the construction industry. It is composed of aggregate bonded together with a fluid cement that cures as it dries. One advantage that it has, compared to other building materials such as steel, is that concrete can be sculptured during the construction process. That is usually achieved by pouring the wet concrete into a formwork, which is a container or mould designed to give the concrete its desired shape. Formwork is typically temporary and is removed once the concrete has sufficiently hardened.

An admixture is a material that is added to concrete to improve its quality, manageability, setting time, or provide additional characteristics.

The present invention relates specifically to the delivery of admixtures to the surface portions of concrete. It is often necessary for the admixture to affect only the surface portions of concrete, for example when joining two pieces of concrete, or when the surface requires different properties from the bulk concrete, such as extra hardness, water protection, or decorative or shaped surfaces. To achieve such surface effects, conventional methods include the application of an admixture to the formwork by painting, rolling or spraying.

There are two problems to consider when using admixtures in concrete. First, relatively small quantities of admixture are employed; typical amounts are up to 5% by mass of cement. For that reason, to ensure that the admixture performs its desired effect, it is important to deliver an accurately measured amount of admixture to the concrete mix.

Secondly, concrete production is time-sensitive. Once the ingredients are mixed, the concrete must be put in place before it hardens. Thus, admixtures are normally added to the concrete immediately before or during the mixing process.

Methods for the delivery of a pre-measured amount of admixtures to concrete are known. For example, U.S. Pat. No. 5,120,367 describes admixture contained in a water-soluble container such that when the container and its contents are introduced into a wet mixer and agitated for a period of time, the water-soluble container is dissolved, and the contents are released into the wet mixer.

However, that document describes admixture delivery that affects the entire batch of concrete. It is not suitable for application of an admixture where the surface portion of concrete needs to be treated in a manner that is different the rest of the concrete.

EP 3512677 discloses a means for targeted delivery of concrete admixture comprising a sheet formed from a water-soluble material, the sheet having a plurality of sealed pockets extending across the surface of the sheet in both lateral dimensions, each pocket containing a quantity of admixture.

Those prior methods only partly solve the problems described above. First, although the methods enable a predetermined amount of admixture to be delivered, they still require a separate pre-measuring step. Furthermore, the prior methods of water-soluble containers or pockets do not fully solve the time-sensitivity problem of delivering admixtures, because the containers or pockets themselves are time-sensitive, being subject to dissolution or deterioration, during storage, transportation, or when attached to the formwork, prior to pouring in the concrete. Indeed, U.S. Pat. No. 5,120,367 recognizes that problem by suggesting that a separate water-insoluble receptacle can be used to house and protect the water-soluble container of admixture. That adds a further step, and therefore further cost, to the admixture delivery process.

The present invention tackles the existing problems by incorporating an admixture within a film of water-soluble material having a removable protective liner. In this way, there is no need for a separate pre-measuring step; and the film is both weather-resistant and substantially time-insensitive.

SUMMARY OF THE INVENTION

Accordingly, the present invention provides a delivery device for concrete admixtures, the device comprising a delivery film of water-soluble material, having a concrete admixture incorporated within the film, the film having a first surface and a second surface, the first surface having a means to attach the film to a formwork for concrete and the second surface having a protective liner, which is removable to allow the water in the concrete to dissolve the film and release the admixture into the concrete, wherein the means to attach the delivery film to the formwork comprises an adhesive layer applied to an adhesive support film.

In one form, the water-soluble material is polyvinyl alcohol.

In one form, the adhesive layer is a pressure sensitive adhesive.

In one form, the adhesive layer is provided with an adhesive release liner.

In one form, the adhesive release liner extends beyond the length or side of the adhesive layer to form a gripping portion to assist in removing the adhesive release liner.

In one form, the film protective liner extends beyond the length or side of the delivery film to form a gripping portion to assist in removing the film protective liner.

In one form, the admixture is a retarder.

In one form, the retarder is a lignosulfonate salt.

In one form, the admixture is a mixture of a plasticizer and a retarder.

In one form, the admixture is a mixture of a polyethylene glycol as plasticizer and a lignosulfonate as retarder.

In one form, the invention is directed to a process for retarding the setting of a surface portion of concrete. The process includes attaching a delivery device as described above to a formwork, and removing the protective liner from the delivery film to allow the water in the concrete to dissolve the film and release the retarder into the concrete.

In one form, the retarder is a lignosulfonate salt.

In one form, the admixture is a mixture of a plasticizer and a retarder.

In one form, the admixture is a mixture of a polyethylene glycol as plasticizer and a lignosulfonate as retarder.

3

Figure 2:
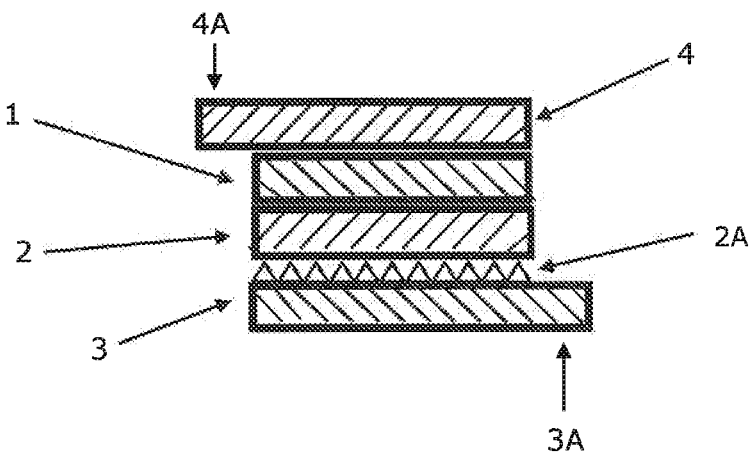

FIG. 2 is a cross-sectional end view of the delivery device, showing the lateral gripping portions.

DETAILED DESCRIPTION OF THE PREFERRED EMBODIMENT

The invention is illustrated by the following specific Examples of a delivery film and a delivery device.

Example 1—Delivery Film

A delivery film was prepared using the following constituents:

Polyvinyl alcohol PVA-205 64.75 grams
Sodium lignosulfonate retarder 43.75 grams
Polyethylene glycol plasticizer PEG 400 10.25 ml
Deionized water 131.25 ml The constituents were combined, melted and introduced into an extrusion machine to form a plastic film with a thickness of 200 microns.

An embodiment of the present invention will now be described with reference to the accompanying drawings.

Example 2—Delivery Device

Figure 1:
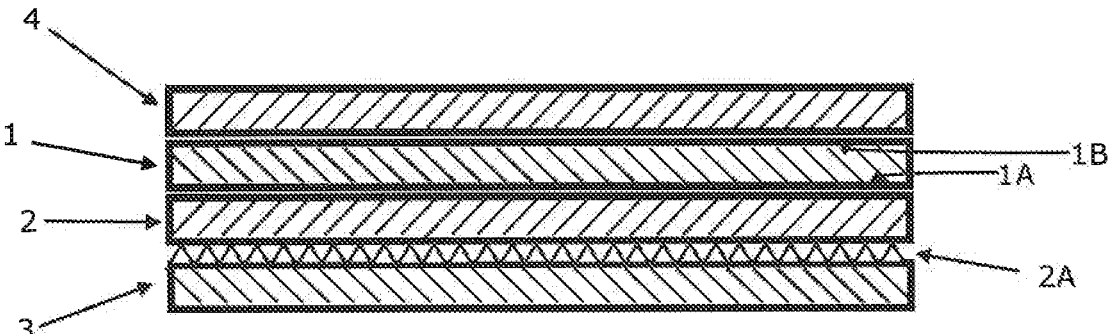
FIG. 1 is a cross-sectional side view of a delivery device of the present invention.

Referring to FIG. 1, the delivery device comprises a water soluble delivery film 1, having a first surface 1A and a second surface 1B. The film contains the constituents as described in Example 1, including a retarding agent and plasticizer. The delivery film 1 is formed by coating the solution as described in Example 1 onto a surface of adhesive support film 2, which has an adhesive layer 2A coated on the other surface. In this way the first surface 1A of the delivery film is bonded to the adhesive layer 2A, which provides a means to attach the delivery film 1 to a formwork. The adhesive layer 2A comprises a pressure-sensitive adhesive and is covered by an adhesive release liner 3. The second surface 1B of the delivery film 1 is provided with a removable film protective liner 4.

In FIG. 2, the end view of the device shows that the film protective liner 4 has a gripping portion 4A extending laterally beyond an edge of the delivery film 1. Similarly, the adhesive release liner 3 has a gripping portion 3A extending laterally beyond the opposite edge of the adhesive support film 2 and the adhesive layer 2A. The gripping portions 3A and 4A are provided to assist the removal of the liners 3 and 4 respectively.

In operation, the adhesive release liner 3 is peeled away, using the gripping portion 3A to expose the adhesive layer 2A. This enables the delivery device to be attached to the formwork using a firm hand pressure. The delivery film 1, containing retarder, is now protected from weathering by means of the protective liner 4 and may remain on the formwork until the concrete is ready to be added. When it is time to pour the concrete, the film protective liner 4 is peeled away, using the gripping portion 4A to expose the delivery film 1 to the concrete. The water in the cement dissolves the delivery film 1 to release the constituents and allow the retarder to exert its effect on the surface portion of the concrete.

The delivery device retards the setting of the concrete for about 72 hours, which is at least three times longer than known concrete retarding methods, such as the use of retarder gels. This increased period allows more flexibility in the construction process, and therefore an improved result. For example, there is time to remove the surface cement paste and expose the aggregate of the concrete, without affecting the setting time of the underlying concrete, to create a sound construction.

Furthermore, it is possible to soften the residual concrete surface with water and remove it up to three weeks later.

The retarder delivery device has health benefits by avoiding the necessity to use high pressure jet wash, or vibrating 'scrabbing' tools, which expose individuals to chemicals, fumes, dusts and vapours.

The water-soluble material is suitably a water-soluble polymeric film-forming material. A preferred water-soluble material is a polyvinyl alcohol. Other polymeric film-forming materials include polyethylene oxide. The water-soluble material may also be cellulose or foam.

The first surface of the delivery film is the surface that is attached to the formwork. The means of attachment is suitably an adhesive layer, preferably comprising a pressure sensitive adhesive, which is an adhesive that requires a light pressure to ensure bonding with the formwork. Pressure sensitive adhesives are typically made from viscoelastic polymers, which may comprise an acrylate polymer, natural rubber, synthetic thermoplastic elastomer or silicone rubber.

The adhesive layer may be coated directly onto the first surface of the delivery film. Preferably, however, the adhesive layer is applied to an adhesive support film, onto which the delivery film is coated. For example, the constituents of the delivery film may be combined in solution; and the solution sprayed onto the non-adhesive surface of the adhesive support film.

An adhesive release liner may be provided over the adhesive layer, to prevent adhesion prior to use. The adhesive release liner may be a peelable sheet that allows the adhesive layer to be exposed when required.

The second surface of the delivery film has a film protective liner to prevent the water-soluble material of the film from contacting water prematurely. Depending on the adhesive properties of the water-soluble material which forms the delivery film, the film protective liner may be a plastic sheet with or without a self-adhesive layer on one side.

The delivery film of water soluble material incorporates the admixture. Suitably, the admixture is finely divided in powder or pulverized form and distributed throughout the material of the film, preferably uniformly. In that way, the required amount of admixture can be applied by cutting the film to the desired length, thus avoiding the necessity to weigh or volumetrically measure the ingredients of admixture.

The delivery film of water soluble material and admixture is sufficiently flexible to adapt to the shape of the formwork.

The surface portion of concrete which is treated by the delivery film of this invention is suitably a depth of from 3 mm to 5 mm from surface, preferably from 3 mm to 4 mm from the surface.

The delivery film is of sufficient thickness to affect the surface portion of the concrete, without affecting the remainder of the concrete. Suitably, the film may be from 50 to 500 microns, preferably from 100 to 300 microns, for example about 200 microns in thickness.

The film protective liner over the second surface of the delivery film and the adhesive release liner over adhesive layer on the first surface of the delivery film are suitably from 100 to 300 microns thick, for example about 200 microns thick. Preferably the film protective liner and the adhesive release liner extend beyond the length or side of the film or adhesive layer to form gripping portions, the portions being non-adhesive and optionally being reinforced, to assist in removing the liners from the film and the adhesive layer.

The delivery film may be provided in pre-cut lengths, having a shape appropriate to the part of the formwork to which it is to be attached. For example, the delivery film may be in the form of elongate lengths, or in the form of tiles having a square, rectangular, circular, or other appropriate shape. The film protective liner and the adhesive release liner of the pre-cut lengths may be provided with non-adhesive gripping extensions as described above.

Alternatively, the film may be provided in the form of a roll. In this case, gripping extensions may be provided by film protective liner and/or the adhesive release liner being wider than the delivery film, so that they form lateral extensions as each section of the film is cut. When the film is provided in the form of a roll, an adhesive release liner may be absent over the adhesive layer, because the adhesive layer will be adjacent the outer surface of the film protective liner. In this case, the adhesion of the adhesive layer to the first surface of the delivery film should be stronger than the adhesion of the adhesive layer to the outer surface of the film protective liner. In that way, the delivery film can be unrolled from a roll with the film protective liner in place over the delivery film, and the adhesive layer is exposed for attachment to the formwork.

Any type of admixture may be used in the device of the present invention, according to the characteristics required. The two admixtures that are most commonly used, and are therefore most appropriate for use in the present invention, are retarders and accelerators. Preferably the admixture used is a retarder.

Because the admixture for use in the present invention is delivered only to the surface portion of the concrete, smaller quantities of admixture are necessary than are normally applied to a whole batch of a concrete. For example, the weight of admixture in the delivery film of this invention used to treat 1 cubic metre of concrete, or 1 square metre of surface of concrete, is suitably from 5 g to 30 g, preferably from 10 g to 20 g.

Retarders are used to delay the hydration reaction that takes place when the concrete starts the setting process. Suitable retarders include sucrose, glucose, hydroxylated carboxylic acids such as gluconic acid, citric acid and tartaric acid and salts thereof, lignosulfonates, phosphonates, lignin, borates such as borax. Preferred retarders are lignosulfonates, especially sodium lignosulfonate.

Accelerators speed up the hydration of the concrete. Suitable accelerators include calcium chloride, calcium nitrate, calcium nitrite, sodium nitrate, calcium formate, triethanolamine and sodium thiocyanate.

Hardening agents or densifiers help to further harden the concrete and include flurosilicate salts, such as sodium, potassium, lithium, or magnesium fluorosilicate.

Plasticizers improve the workability and compressive strength of the concrete. They increase the water retention capacity of the concrete and reduce the rate of evaporation of water from the surface. A plasticizer is generally used about 1¹/o by weight of cement. Greater quantities reduce the strength and result in excessive segregation of the concrete. Suitable plasticizers include polyethylene glycols, in particular a low molecular weight grade thereof, such as polyethylene glycol 400, which has a molecular mass of from 380-420 g/mol.

Other admixtures include, for example, air entraining agents, bonding agents, corrosion inhibitors, crystalline admixtures, pigments, and pumping aids.

Suitably, two or more admixtures may be present in the delivery film of this invention. Preferred combinations of admixtures are a mixture of plasticizer and accelerator and a mixture of plasticizer and retarder, for example a mixture of a polyethylene glycol as plasticizer and a lignosulfonate as retarder.

The delivery film of this invention may be manufactured by conventional film forming methods, such as by extrusion. Film protective liners and adhesive release liners are commercially available.

To prepare the delivery device of this invention, the components of the device can be combined in any suitable order. In a preferred method, an adhesive layer is applied to one surface of an adhesive support film. The delivery film is formed by preparing a solution of the delivery film ingredients and coating the non-adhesive surface the adhesive support film with said solution. An adhesive release liner is then applied to the opposite surface of the adhesive layer. Finally, a film protective liner is applied to the exposed surface of the delivery film.

In use, the first surface of the delivery film is attached to the formwork, preferably by means of an adhesive layer, having an adhesive release liner. The adhesive release liner is peeled away to exposes the adhesive layer, which is then used to attach the delivery film and protective liner to the formwork, by using a firm hand pressure. The delivery film may be attached before or after the formwork is assembled, providing flexibility for the construction work to be carried out.

The length and shape of the delivery film is adjusted to fit the shape of the formwork, to achieve the required distribution of admixture on the surface portion of the concrete. This may be an even distribution, or may be determined by desired patterns or pigments or decorative features.

Once the delivery film is attached to the formwork, with the film protective liner in place, it is both weather resistant and substantially time insensitive. When it is time to pour the concrete, the film protective liner is peeled away from the second surface of the delivery film, which is then exposed to the concrete. The water in the cement dissolves the delivery film to allow the admixtures to be released and exert their effects of the surface of the concrete.

The advantages of the delivering admixtures specifically to the surface portions of concrete using the delivery film of this invention vary according to the type of admixture used.

Using an accelerator in the present delivery film enables the face of the concrete to be hardened first, thus reducing damage to the more delicate material immediately above the aggregate, known as the lattice, and protecting the important surface features such as corners, rebate angles and bolt holes which will be visible when the construction is finished. If an accelerator is added to the entire batch of concrete, it can weaken the strength of the concrete mix. But if the accelerator is added only to the surface to protect the key features first, then the formwork can be removed before the rest of the concrete is fully hardened.

Using a hardener in a surface-only application protects the surface against weathering. As with an accelerator, adding a hardener to the whole batch of concrete, it has inconsistent effects on the strength of the concrete mix.

A rust inhibitor is usually only necessary at the surface of concrete and can be valuable where the concrete is to be used, for example in water treatment facilities.

Pigments and dyes are again generally required only in the surface portion of concrete. By applying these to the surface, it is possible to produce a constant colour over the entire surface of the concrete, or produce coloured surface patterns that would not be possible by adding pigments or dyes to the whole batch.

Use of a retarder as the admixture within the delivery film is a preferred embodiment of this invention. The key benefit of the use of a retarder to treat the surface portion of concrete is the ability to slow the setting time of the surface portion to enable manual removal of the surface cement paste and expose the aggregate of the concrete, without affecting the setting time of the underlying concrete. That is useful for creating a construction joint, as well as for producing decorative surface effects, lettering and numbering.

The delivery device of this invention containing a retarder as the admixture has demonstrated unexpectedly advantageous properties, providing considerably longer retarding times than are possible by other methods.

Although the present invention is not limited to a particular mechanism, it is believed that when the delivery film dissolves and releases the retarder, it absorbs the water from the surface portion of the concrete. Because water is necessary for the hardening process, the absence of water in the surface portion effectively halts the setting process completely for up to 72 hours, until atmospheric moisture allows the surface to harden.

The foregoing disclosure of specific embodiments is intended to be illustrative of the broad concepts comprehended by the invention.

The invention claimed is:

1. A delivery device for concrete admixtures, the device comprising a delivery film consisting of water-soluble material, having a concrete admixture incorporated within the delivery film, the delivery film having a first surface and an opposite second surface, the first surface having a means to attach the film to a formwork for concrete and the second surface having a removable protective liner, the delivery device configured so that the water-soluble material is capable of being dissolved by water in the concrete to thereby release the admixture into the concrete, wherein the means to attach the delivery film to the formwork comprises an adhesive layer applied to an adhesive support film at the first surface.

2. A delivery device as claimed in claim 1 wherein the water-soluble material is polyvinyl alcohol.

3. A delivery device as claimed in claim 1 wherein the adhesive layer comprises a pressure sensitive adhesive.

4. A delivery device as claimed in claim 1 wherein the adhesive layer is provided with an adhesive release liner.

5. A delivery device as claimed in claim 4 wherein the adhesive release liner extends beyond the length or side of the adhesive layer to form a gripping portion to assist in removing the adhesive release liner.

6. A delivery device as claimed in claim 1 wherein the film protective liner extends beyond the length or side of the delivery film to form a gripping portion to assist in removing the film protective liner.

7. A delivery device as claimed in claim 1 wherein the admixture is a retarder.

8. A delivery device as claimed in claim 7 wherein the retarder is a lignosulfonate salt.

9. A process for retarding the setting of a surface portion of concrete, which process comprises attaching a delivery device as claimed in claim 7 to a formwork, removing the protective liner from the delivery film to allow the water in the concrete to dissolve the film and release the retarder into the concrete.

10. The process as claimed in claim 9 wherein the retarder is a lignosulfonate salt.

11. The process as claimed in claim 9 wherein the admixture is a mixture of a plasticizer and a retarder.

12. The process as claimed in claim 9 wherein the admixture is a mixture of a polyethylene glycol as plasticizer and a lignosulfonate as retarder.

13. A delivery device as claimed in claim 1 wherein the admixture is a mixture of a plasticizer and a retarder.

14. A delivery device as claimed in claim 13 wherein the admixture is a mixture of a polyethylene glycol as plasticizer and a lignosulfonate as retarder.

* * * * *